(12) United States Patent
Chen

(10) Patent No.: US 6,209,840 B1
(45) Date of Patent: Apr. 3, 2001

(54) MECHANISM FOR THE RELATIVE POSITIONING OF CHAIR ARM

(76) Inventor: Chao Ken Chen, No. 15-1 Fu-Kung Rd., Chung-Hua Hsien (TW)

( * ) Notice: Subject to any disclaimer, the term of this patent is extended or adjusted under 35 U.S.C. 154(b) by 0 days.

(21) Appl. No.: 09/343,365

(22) Filed: Jun. 30, 1999

(30) Foreign Application Priority Data

Jul. 4, 1998 (TW) ........................................ 86208465 A01

(51) Int. Cl.$^7$ .................................................. F16M 11/00
(52) U.S. Cl. .................... 248/407; 297/411.36; 297/353; 248/118; 248/423
(58) Field of Search ................................ 248/407, 118.1, 248/118, 161, 157, 423, 125.1; 297/411.36, 353

(56) References Cited

U.S. PATENT DOCUMENTS

| | | | |
|---|---|---|---|
| 5,382,079 | * | 1/1995 | Wilson et al. .................. 297/411.36 |
| 5,664,842 | * | 9/1997 | Tseng ............................... 297/411.36 |
| 5,895,095 | * | 4/1999 | Chen ................................ 297/411.36 |
| 5,908,221 | * | 6/1999 | Neil .................................. 297/411.36 |

* cited by examiner

Primary Examiner—Anita M. King
Assistant Examiner—A. Joseph Wujciak
(74) Attorney, Agent, or Firm—Pro-Techtor International Services

(57) ABSTRACT

A mechanism for the relative positioning of chair arm comprises a shroud including a first opening, a second opening, and a top plate; a supporting member disposed within the shroud including a notched cavity; a shuttle member disposed between the shroud and the supporting member comprising a vertical member having a slanted slot, a top horizontal member having a riser, a spring disposed on the riser being biased between the top horizontal member and the top plate, and a trigger button disposed on the top horizontal member; and a lock pin for slidably securing the slanted slot, the first opening, and the cavity together. Raising the trigger button will cause the lock pin to slide along the cavity and release of the trigger button will cause the lock pin to lock in the cavity.

2 Claims, 5 Drawing Sheets

MECHANISM FOR THE RELATIVE POSITIONING OF CHAIR ARM

BACKGROUND OF THE INVENTION

1. Field of the Invention

The present invention relates to a mechanism for positioning a moveable member relative to a fixed member, and more particularly to a mechanism for the relative positioning of chair arm which may be adjusted with a button.

2. Description of Related Art

Various mechanisms for the relative positioning of telescopic members have been located in a search. For example, U.S. Pat. No. 5,388,892 discloses a mechanism for the relative positioning of telescoping members.

However, it is considered to have many components and thus complicated in structure. Further, these components are individually manufactured, resulting in the increase of manufacturing cost. Furthermore, these components are subject to be stuck in operation due to interfering with one another. To the worse, these components produce loud sounds when operated and have been found have a shorter life cycle due to abnormal wear.

SUMMARY OF THE INVENTION

It is thus an object of the present invention to provide a device which is simple in structure, easy in assembly, and simple in mechanism, and thus resulting in a decrease of noise, component wear, and an increase of life cycle.

The advantages of the present invention are realized by providing a mechanism for the relative positioning of chair arm comprising a shroud comprises a transverse first opening through two sides, a second opening disposed on a side and higher than the first opening, and a top plate; a supporting member includes a longitudinal cavity having a number of semi-circular notches on a side; a shuttle member comprises a vertical member having a slanted slot provided near the bottom, a top horizontal member having an opening where a riser is provided on a side parallel to the vertical member, a spring disposed on the riser being biased between the top horizontal member and the top plate, and a trigger button fastened to the top horizontal member; and a lock pin wherein the shuttle member is inserted into the shroud for enabling the top horizontal member to pass through the second opening for engaging the vertical member against the side of the shroud; put the shroud on the supporting member such that the lowermost semicircular notch coincidental with the first opening and the slanted slot; and insert the lock pin through the slanted slot, the first opening, and the lowermost semicircular notch to slidably secure together. As such, raising the trigger button will cause the lock pin to slide along the longitudinal cavity away from the semi-circular notches and release of the trigger button will cause the lock pin to move toward the desired notch for engagement therewith.

The above and other objects, features and advantages of the present invention will become apparent from the following detailed description taken with the accompanying drawings.

DETAILED DESCRIPTION OF THE PREFERRED EMBODIMENTS

Figure 1:
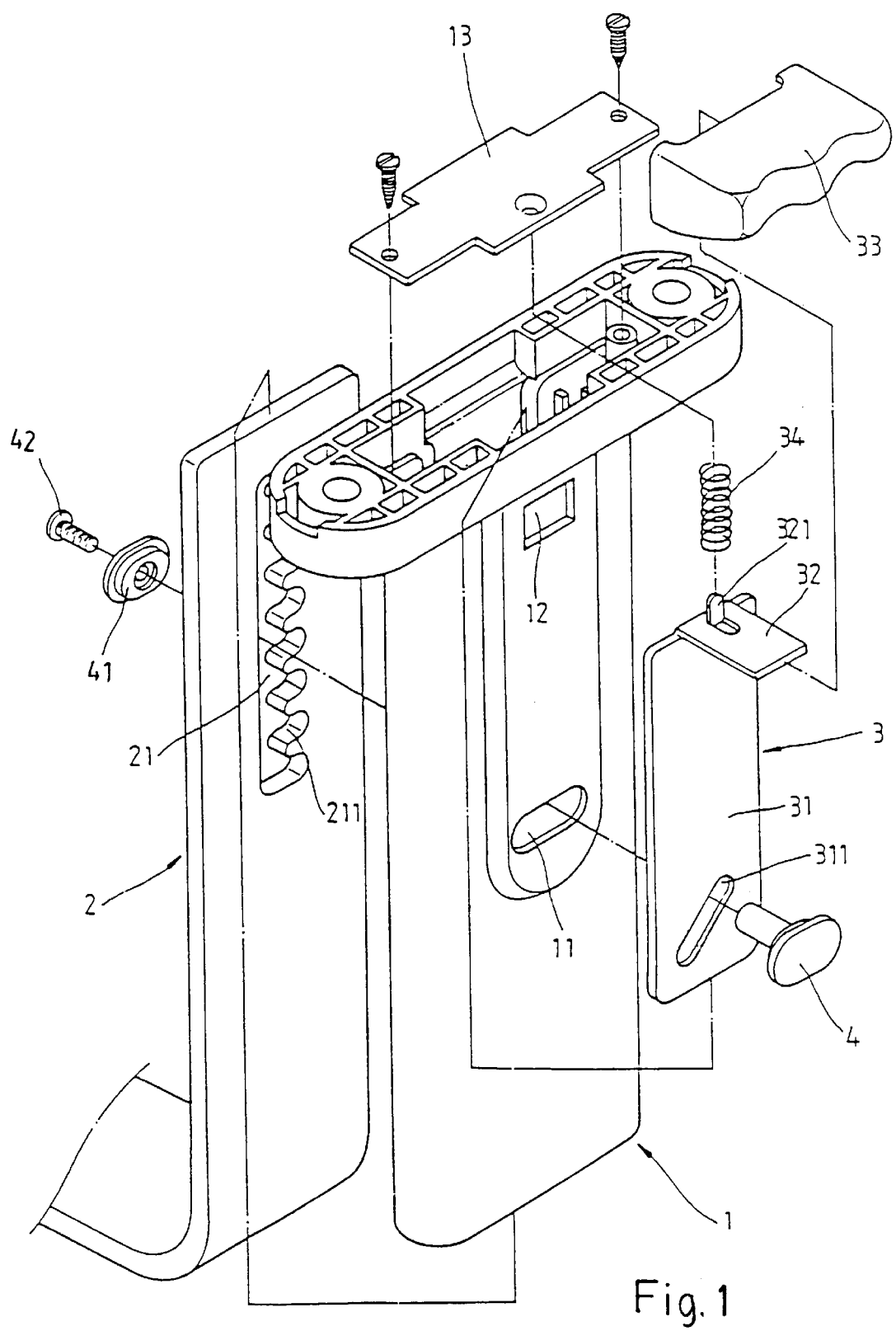
FIG. 1 is an exploded view of an embodiment of the present invention.

Referring to FIG. 1, there is shown a mechanism according to the invention comprising a shroud 1, a supporting member 2, a shuttle member 3, and a lock pin 4. The shroud 1 comprises a transverse first opening 11 through two sides, a second opening 12 disposed on a side and higher than the first opening 11, and a top plate 13. The supporting member 2 is a vertical plate member extended from frame of a chair (not shown) having a longitudinal cavity 21. The longitudinal cavity 21 has a number of semi-circular notches 211 on a side. The shuttle member 3 is substantially in the shape of an inverse "L" in a side view. The shuttle member 3 comprises a vertical member 31 having a slanted slot 311 provided near the bottom, and a top horizontal member 32. The top horizontal member 32 comprises an opening where a riser 321 is provided on a side parallel to the vertical member 31.

Figure 2:
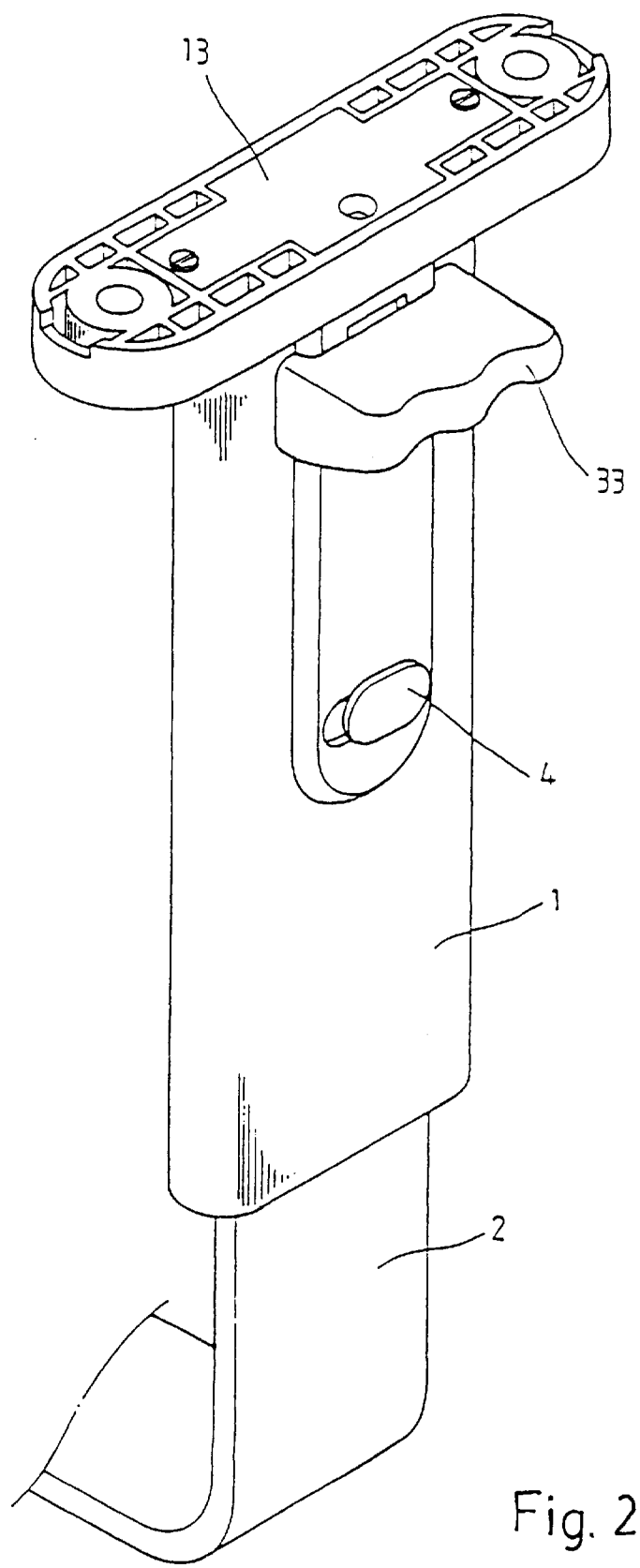
FIG. 2 is a perspective view of FIG. 2.

In assembly, first insert the shuttle member 3 into the shroud 1 for enabling the top horizontal member 32 to pass through the second opening 12 such that the vertical member 31 engages against the side of the shroud 1. Then, put the shroud 1 on the supporting member 2 such that the lowermost semicircular notch 211, the first opening 11, and the slanted slot 311 are substantially in a same horizontal position. Then, insert the lock pin 4 through the slanted slot 311, the first opening 11, and the lowermost semicircular notch 211 in which end of the lock pin 4 is extended from the opposite side of the shroud 1. Then, put a washer 41 on the extended portion of the lock pin 4 and further use a bolt 42 to secure the washer 41 and the lock pin 4. Then, put a spring 34 on the riser 321 so as to prevent any lateral movement of the spring 34. Then, use a pair of fasteners (e.g., screws) to secure the top plate 13 to the top of the shroud 1 such that the spring 34 is biased between the top horizontal member 32 and the top plate 13. Finally, urge a trigger button 33 to cling to the top horizontal member 32, thus providing the fit setting of trigger button 33 onto the top horizontal member 32. The assembled mechanism is shown in FIG. 2.

Figure 3:
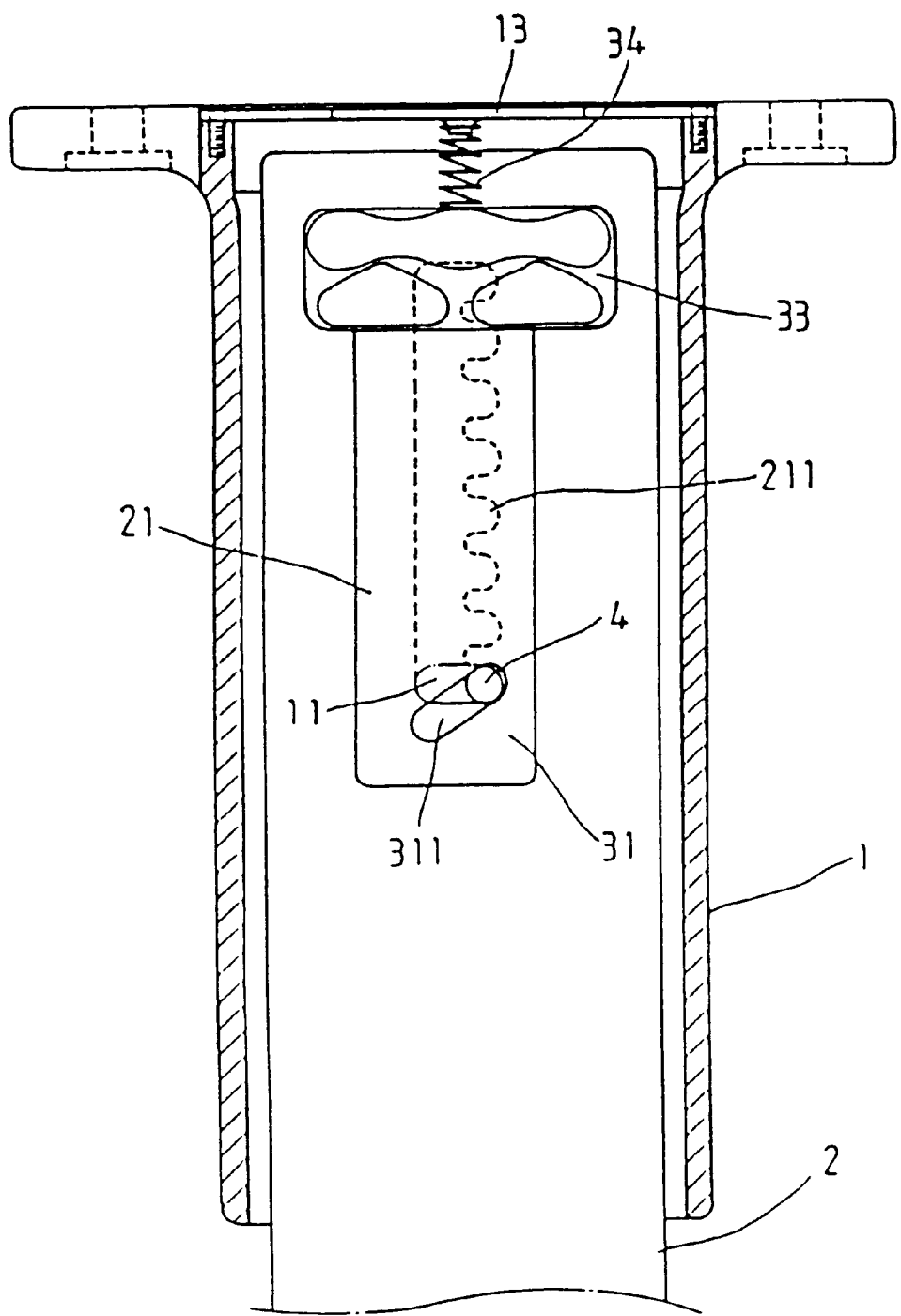
FIGS. 3–5 are longitudinal cross-sectional views of FIG. 1 showing a locked, lowermost position relative to the supporting member, an unlocked position, and a locked, arbitrarily selected position relative to the supporting member respectively.

As best shown in FIG. 3, in a situation where no manual force is exerted on the trigger button 33, the shuttle member 3 is pushed downwardly by the expansion of the spring 34 such that the lock pin 4 moves to the topmost of the slanted slot 311. Note that movement of the lock pin 4 is limited within the transverse first opening 11, i.e., only horizontal movement and no vertical movement. Accordingly, the lock pin 4 is guided to the lowermost semicircular notch 211 and contained therein after moving from the left lowest end upwardly to the right highest end of the slanted slot 311. At this point, the shuttle member 3 and the shroud 1 are restrained from all movement relative to the supporting member 2.

Figure 4:
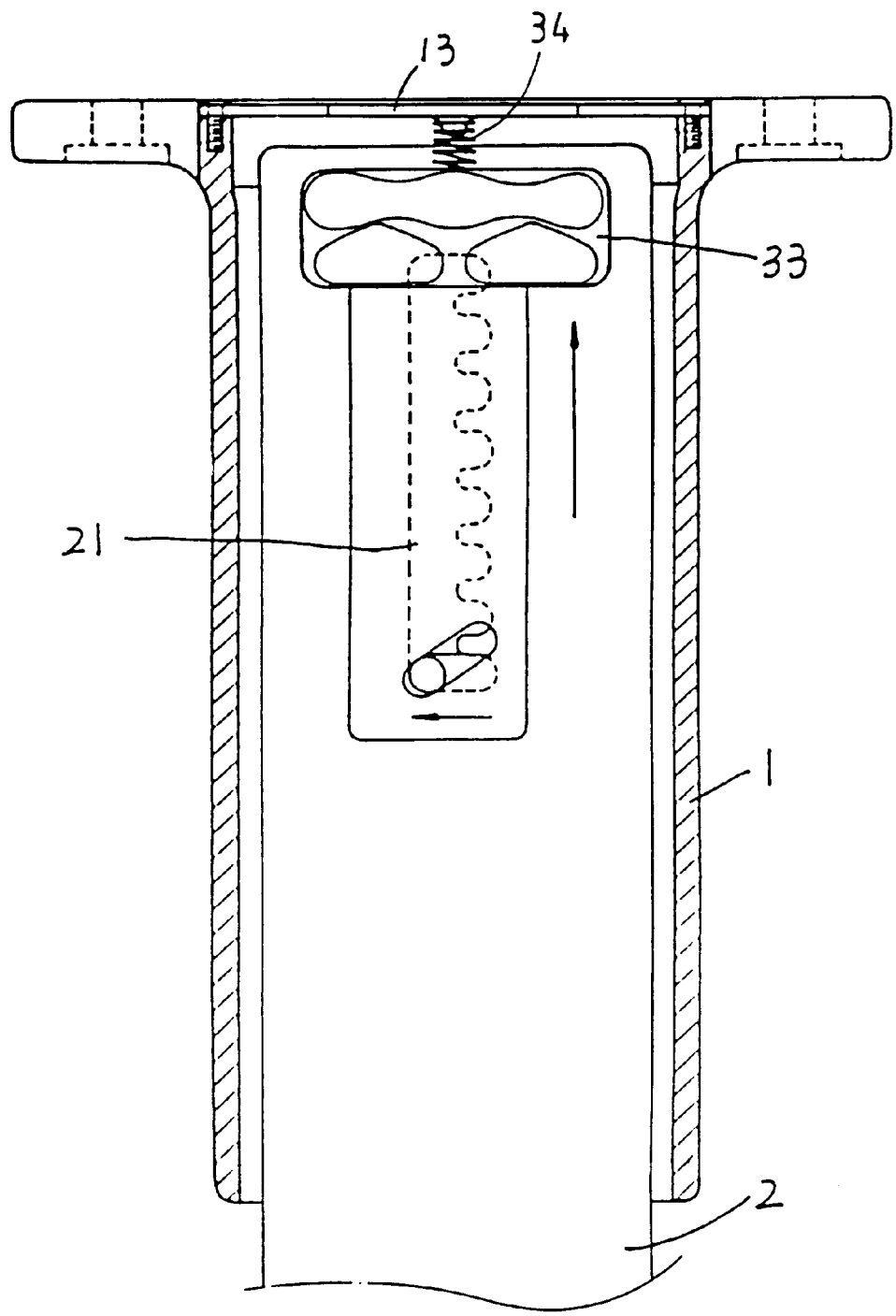

In FIG. 4, when a manual upward force applies on the trigger button 33 to raise the shuttle member 3 (the shroud 1 is not moved at this moment), the lock pin 4 is restricted to lateral movement (i.e., to the left) by the first opening 11. As such, the lock pin 4 is guided away from the semicircular notch 211 by the slanted slot 311 in response to an upward movement of the shuttle member 3. As a result, the shuttle member 3 and the shroud 1 are free to slidably move along the longitudinal direction of the longitudinal cavity 21.

Figure 5:
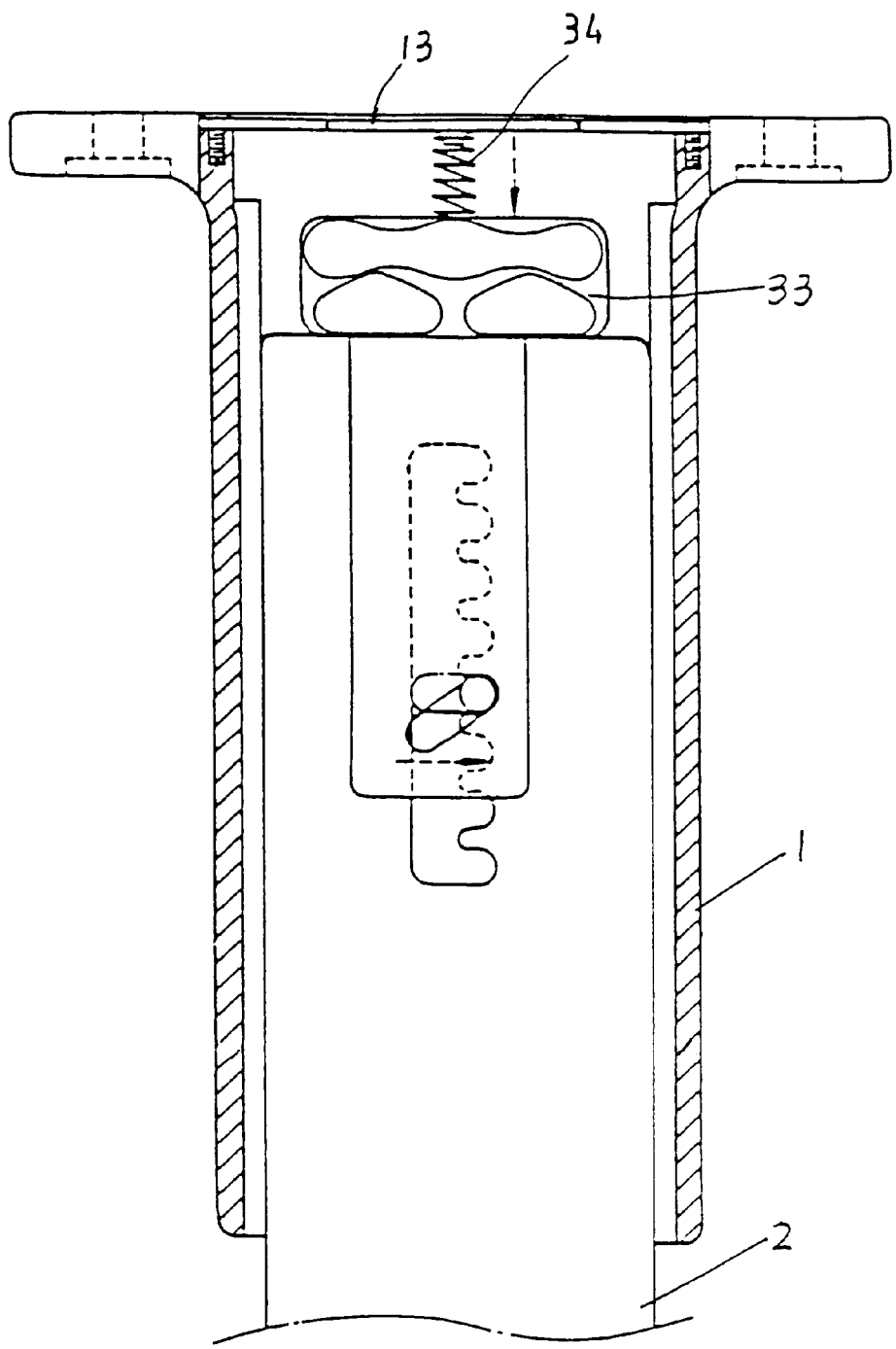

Referring to FIG. 5, the manual upward force is removed after a desired position of the shroud 1 relative to the supporting member 2 is selected. Thereafter, the shuttle member 3 is pushed downwardly by the expansion of the spring 34. Again, the lock pin 4 is guided to the desired semicircular notch 211 and contained therein after moving from the left lowest end upwardly to the right highest end of the slanted slot 311. As a result, the shuttle member 3 and the shroud 1 are restrained from all movement relative to the supporting member 2.

While the invention herein disclosed has been described by means of specific embodiments, numerous modifications and variations could be made thereto by those skilled in the art without departing from the scope of the invention set forth in the claims.

What the invention claimed is:

1. A positioning mechanism comprising:

a shroud including a first opening that passes through said shroud, a second opening that passes through said shroud, said second opening is disposed above said first opening, and a top plate, a supporting member disposed in an interior of said shroud, said supporting member comprises a longitudinal cavity having a plurality of notches on a side of said cavity, a shuttle member disposed in said interior of said shroud, said shuttle member includes a vertical member having a slanted slot provided near a bottom end of said vertical member, a top horizontal member of said shuttle member has a riser protruding from a surface of said top horizontal remember, a spring being disposed on said riser and being biased between said top horizontal member and said top plate, and a lock pin that is inserted through said slanted slot, said first opening, and said cavity, said lock pin being received in one of said notches; wherein raising said top horizontal member of said shuttle member causes said lock pin to slide along said cavity, said first opening, and said slanted slot so that said lock pin moves out of said one of said notches, thereby allowing motion of said shroud relative to said supporting member, and when said horizontal member is released, a biasing force of said spring causes said lock pin to slide in an opposite direction along said cavity, said first opening, and said slanted slot so that said lock pin moves into one of said notches, thereby fixing said shroud in position on said supporting member.

2. The positioning mechanism of claim 1 wherein:

said positioning mechanism further comprises a trigger button formed on said top horizontal member.

\* \* \* \* \*